US011898529B2

United States Patent
Fasseland

(10) Patent No.: US 11,898,529 B2
(45) Date of Patent: Feb. 13, 2024

(54) INLET SCREEN FOR A HYDROPOWER PLANT

(71) Applicant: FASSELAND MEKANISKE VERKSTED AS, Åseral (NO)

(72) Inventor: Johan Arnt Fasseland, Lindesnes (NO)

( * ) Notice: Subject to any disclaimer, the term of this patent is extended or adjusted under 35 U.S.C. 154(b) by 330 days.

(21) Appl. No.: 16/759,889

(22) PCT Filed: Nov. 6, 2018

(86) PCT No.: PCT/EP2018/080255
§ 371 (c)(1),
(2) Date: Apr. 28, 2020

(87) PCT Pub. No.: WO2019/086692
PCT Pub. Date: May 9, 2019

(65) Prior Publication Data
US 2021/0363958 A1 Nov. 25, 2021

(30) Foreign Application Priority Data
Nov. 6, 2017 (NO) .................................. 20171753

(51) Int. Cl.
*F03B 11/08* (2006.01)
*B01D 29/44* (2006.01)
(Continued)

(52) U.S. Cl.
CPC ............ *F03B 11/08* (2013.01); *B01D 29/445* (2013.01); *B01D 29/608* (2013.01); *B01D 35/18* (2013.01)

(58) Field of Classification Search
None
See application file for complete search history.

(56) References Cited

U.S. PATENT DOCUMENTS 279,901 A * 6/1883 Martine .................. E02B 1/003
239/548
345,773 A * 7/1886 Crane ..................... A01K 63/04
210/170.09
(Continued)

FOREIGN PATENT DOCUMENTS

CN 108 846 792 A 8/2015
JP S56 128811 A 10/1981
(Continued)

OTHER PUBLICATIONS

International Search Report of the International Searching Authority for PCT/EP2018/080255 dated Jan. 4, 2019.

*Primary Examiner* — Robert J Popovics
(74) *Attorney, Agent, or Firm* — Colson Law Group, PLLC

(57) ABSTRACT

The present invention relates to an inlet screen adapted to be arranged at the water inlet (8) of a hydropower plant and comprises a plurality of elongated bars (20), said bars (20) being separated by a distance holding means, each elongated bar (20) having in its elongation a proximal portion and a distal portion, and an upstream region and a downstream region, said upstream and downstream regions being at an angle in relation to said proximal and distal portions, at least one of said bars (20) defining a space (36; 36*a*) extending along at least a portion of the elongation of said bar (20), said bar (20) being provided with an electric heating means (31). In accordance with the invention, said elongated bar has an elongated intermediate portion (38*a*), said space (36; 36*a*) being defined in either of the upstream region (35*a*) and the downstream region (35*b*), said intermediate portion (38*a*) extending along the elongation of the bar (20) between the upstream region (35*a*) and the downstream region (35*b*), said electric heating means (31) comprising at least one
(Continued)

electric heating member (37) being introduced into said space (36; 36a).

21 Claims, 14 Drawing Sheets

(51) Int. Cl.
  *B01D 29/60*   (2006.01)
  *B01D 35/18*   (2006.01)

(56) References Cited

U.S. PATENT DOCUMENTS

| | | | | |
|---|---|---|---|---|
| 426,988 A * | 4/1890 | Crocker | ............... | C02F 1/5281 |
| | | | | 210/301 |
| 838,564 A * | 12/1906 | Nurphy | ............... | E02B 1/003 |
| | | | | 210/162 |
| 888,924 A * | 5/1908 | Pierce | ............... | E02B 1/003 |
| | | | | 405/61 |
| 1,109,385 A * | 9/1914 | Allison | ............... | E03F 5/14 |
| | | | | 210/155 |
| 2,152,619 A * | 3/1939 | Maher | ............... | E03B 3/04 |
| | | | | 210/488 |
| 2,361,231 A * | 10/1944 | Nebolsine | ............... | F04D 29/708 |
| | | | | 137/550 |
| 2,837,211 A * | 6/1958 | Everson | ............... | E02B 8/023 |
| | | | | 210/154 |
| 3,820,342 A * | 6/1974 | Stipanov | ............... | E02B 8/085 |
| | | | | 405/83 |
| 3,957,006 A * | 5/1976 | Lapeyre | ............... | B63B 35/00 |
| | | | | 114/65 R |
| 3,996,138 A * | 12/1976 | Daidola | ............... | E02B 1/006 |
| | | | | 210/170.11 |
| 4,058,982 A * | 11/1977 | Wright | ............... | E02B 15/02 |
| | | | | 165/45 |
| 4,064,048 A * | 12/1977 | Downs | ............... | A01K 79/02 |
| | | | | 210/160 |
| 4,415,462 A * | 11/1983 | Finch | ............... | E02B 5/08 |
| | | | | 210/162 |
| 4,594,024 A * | 6/1986 | Jenkner | ............... | E02B 9/04 |
| | | | | 405/80 |
| 4,740,105 A * | 4/1988 | Wollander | ............... | E02B 8/085 |
| | | | | 405/83 |
| 5,034,122 A * | 7/1991 | Wiesemann | ............... | B01D 29/445 |
| | | | | 209/205 |
| 5,062,120 A * | 10/1991 | Daly | ............... | G01N 11/08 |
| | | | | 340/580 |
| 5,841,289 A * | 11/1998 | Yankielun | ............... | G01N 22/04 |
| | | | | 340/580 |
| 5,861,756 A * | 1/1999 | Yankielun | ............... | G01N 27/221 |
| | | | | 340/580 |
| 5,900,820 A * | 5/1999 | Yankielun | ............... | G08B 19/02 |
| | | | | 340/580 |
| 6,451,204 B1 * | 9/2002 | Anderson | ............... | E02B 5/085 |
| | | | | 210/162 |
| 7,708,494 B2 * | 5/2010 | McLaughlin | ............... | E02B 1/006 |
| | | | | 405/80 |
| 7,950,527 B2 * | 5/2011 | Osborne | ............... | B01D 35/02 |
| | | | | 210/172.3 |
| 8,282,836 B2 * | 10/2012 | Feher | ............... | E02B 9/04 |
| | | | | 210/162 |
| 8,292,089 B2 * | 10/2012 | Osborne | ............... | B01D 35/02 |
| | | | | 210/172.3 |
| 8,297,448 B2 * | 10/2012 | Watson | ............... | E02B 5/08 |
| | | | | 210/172.3 |
| 8,505,154 B2 * | 8/2013 | Schuler | ............... | B01D 35/02 |
| | | | | 15/301 |
| 9,108,127 B2 * | 8/2015 | Schuler | ............... | B01D 29/46 |
| 9,273,439 B1 * | 3/2016 | Perkins | ............... | E02B 5/085 |
| 9,567,740 B2 * | 2/2017 | Sadler | ............... | E03F 5/06 |
| 9,943,786 B2 * | 4/2018 | Ekholm | ............... | B01D 35/18 |
| 10,124,279 B2 * | 11/2018 | Schuler | ............... | B01D 29/46 |
| 10,801,189 B2 * | 10/2020 | Watson | ............... | E02B 5/08 |
| 11,066,798 B2 * | 7/2021 | Paczek | ............... | E02B 8/06 |
| 11,192,068 B2 * | 12/2021 | Ekholm | ............... | B01D 29/661 |
| 11,428,219 B2 * | 8/2022 | Hofer | ............... | B01D 29/33 |
| 11,584,661 B2 * | 2/2023 | Liberman | ............... | C02F 1/004 |
| 11,633,680 B2 * | 4/2023 | Simonelli | ............... | B01D 29/445 |
| | | | | 210/357 |
| 11,719,238 B2 * | 8/2023 | Hofer | ............... | B01D 33/801 |
| | | | | 210/297 |
| 11,795,067 B2 * | 10/2023 | Liberman | ............... | A01K 61/70 |
| 2003/0029604 A1 * | 2/2003 | Nagaoka | ............... | B01D 29/15 |
| | | | | 165/95 |
| 2008/0213045 A1 * | 9/2008 | Tappel | ............... | E02B 8/085 |
| | | | | 405/81 |
| 2010/0224570 A1 * | 9/2010 | Feher | ............... | E02B 9/04 |
| | | | | 210/162 |
| 2011/0146802 A1 * | 6/2011 | Feher | ............... | E02B 5/08 |
| | | | | 137/544 |
| 2011/0290743 A1 * | 12/2011 | Osborne | ............... | B01D 29/114 |
| | | | | 210/335 |
| 2013/0061421 A1 * | 3/2013 | Schuler | ............... | B01D 29/114 |
| | | | | 137/544 |
| 2013/0206706 A1 * | 8/2013 | Ekholm | ............... | E02B 9/04 |
| | | | | 210/97 |
| 2014/0145445 A1 | 5/2014 | Richer et al. | | |
| 2015/0306527 A1 * | 10/2015 | Schuler | ............... | B01D 29/46 |
| | | | | 210/190 |
| 2021/0363958 A1 * | 11/2021 | Fasseland | ............... | B01D 35/18 |

FOREIGN PATENT DOCUMENTS

| | | |
|---|---|---|
| JP | H02 153105 A | 6/1990 |
| JP | 2017 066724 A | 4/2017 |
| RU | 2 062 315 C1 | 6/1996 |
| WO | 2012/103654 A1 | 8/2012 |

* cited by examiner

INLET SCREEN FOR A HYDROPOWER PLANT

TECHNICAL BACKGROUND OF THE INVENTION

The present invention relates to an inlet screen adapted to be arranged at the water inlet of a hydropower plant, comprising a plurality of elongated bars, said bars being separated by a distance holding means, each elongated bar having in its elongation a proximal portion and a distal portion, and an upstream region and a downstream region, said upstream and downstream regions being at an angle in relation to said proximal and distal portions, at least one of said bars defining a space extending along at least a portion of the elongation of said bar, said bar being provided with an electric heating means.

It also relates to a hydropower plant comprising to such an inlet screen in front of the water inlet of a turbine, wherein the bars are arranged in such way that the distal portion of the bars is underneath the water surface, said proximal portion being arranged at, above or underneath the water surface above the water surface.

During the cold period of the year the water becomes super-cooled when the outdoor temperature is lower than 0° C. such that the water freezes; the lower the outdoor temperature, the larger the super-cooling effect. The water freezes at nuclei in the water to small crystals, also called frazil ice, first at the surface of lakes, then towards the bottom of the lake. The thickness of the ice layer of the lake depends on the super-cooling effect, i.e. the outdoor temperature. However in rivers, the frazil ice will mix into the entire depth, due to the turbulent flow of the river, also causing the surface of rivers to freeze at lower temperatures than lakes.

The frazil ice crystals will grow in size and stick to objects, e.g. inlet screens of hydropower plants, while reducing or even blocking flow of water through the inlet screen. The build-up starts by initial frazil ice adhesion on the upstream edges of the bars of the inlet screens. More frazil ice is accumulated on each bar and will extend in a direction across the streaming water towards and to accumulations of frazil ice on neighbouring bars, such that the flow of water is blocked. Depending on the size of the super-cooling effect, i.e. how low the temperature is underneath the freezing point 0° C., the accumulation of frazil ice may be quick and may continue until the whole inlet screen is more or less completely covered with ice.

Inlet screens for hydropower plants are also known as trash racks, since they are intended to protect the turbines from branches and other larger debris. This requirement decides the distance between the bars.

The article "Frazil Ice Blockage of Intake Trash Racks" by Steven F. Daly, published by Cold Regions Technical Digest, No. 91-1, March 1991, suggests some solutions to reduce the problems of frazil ice on inlet screens of hydropower plants, by heating the trash rack by electric resistance heaters, steam or warm water. Another described solution is to make the trash racks in aluminium instead of steel, since steel rusts quickly in water and the adhesion strength between ice and rusted steel is high. According to the article, the trash racks may be provided with a coating or be made of plastic, but also states that the use of coatings or plastic does not stop frazil ice to be accumulated on the trash rack, only makes the manual removal of ice somewhat easier. The article also mentions removal of frazil ice by heating the inflowing water, such that it is no longer super-cooled when it arrives at the trash rack. The article also refers to removing of frazil ice by using electric or air powered vibrators, and even by blasting dynamite, even though it is stated that the latter is not recommended, The Article "Laboratory Investigation of Trash Rack Freezeup by Frazil Ice", published in CRREL Report by Annika Andersson and Steven F. Daly, September 1992 describes experiments of the build up of frazil ice on trash rack bars made of aluminium having different cross-sections, more particular rectangular, square, round and pointed.

The article "Detection of Frazil Ice at Water Intakes at Träbena Power Station", Bachelor Degree Project in Mechanical Engineering by Iosu Carrera Artola and Alejandro Lucena Garcerán at University of Skövde, Sweden, spring term 2014 concentrates on how to detect the generation of frazil ice, while suggesting more or less the same alternatives as discussed by the article "Frazil Ice Blockage of Intake Trash Racks" mentioned above. The article also shows a cross-section of a trash-rack bar made of an aluminium profile having an empty space in the middle for some electrical resistances of heating the bars in order to prevent frazil ice to accumulate on the bar. The article also suggests detection frazil ice on the inlet screen by capacitive sensors arranged at the upstream portion of the bar.

Prevention of accumulation of frazil ice—also referred to as anchor ice—by a combination of steam-pipes and electricity is known from U.S. Pat. No. 838,564, published 1906 and U.S. Pat. No. 888,924, published 1908.

Detection of frazil ice by a capacitive sensor to be placed in front of an inlet grating is also known from U.S. Pat. Nos. 5,841,289 and 5,900,820.

SUMMARY OF THE INVENTION

The object of the present invention is to prevent accumulation of frazil ice on an inlet screen of a hydropower plant.

This object has been achieved by the inlet screen of the initially defined kind, furthermore having the features that said elongated bar has an elongated intermediate portion, said space being defined in either of the upstream region and the downstream region, said intermediate portion extending along the elongation of the bar between the upstream region and the downstream region, said electric heating means comprising at least one electric heating member being introduced into said space.

In case the bar is provided with a single space, the space is arranged away from where the distance holding means is to contact the bar, such that the strength of the bar is not jeopardized and such that it is possible to add an electric heating means inside the single space without colliding with the distance holding means.

Suitably, wherein said bar defines a further space extending along at least a portion of the elongation of said bar, said space and said further space being spaced from one another, said space being defined in the upstream region and said further space being defined in said downstream region, said intermediate portion extending along the elongation of the bar between said space and said further space, said electric heating means comprising at least one electric heating member being introduced into any one of said space and said further space.

Hereby is achieved that when a bar is provided with more than one, the spaces are arranged away from where the distance holding means is to contact the bar, such that the strength of the bar is not jeopardized and such that it is possible to add an electric heating means inside the single space without colliding with the distance holding means.

Preferably, said distance holding means comprises at least one distance holding member for keeping the bars in a substantially parallel relationship, said distance holding member being non-detachably or non-detachably connected to a pair of neighbouring bars at said intermediate portion.

Hereby, a stable inlet screen is achieved, reducing the risk for being deformed by ice build up between the bars.

Preferably, a plurality of neighbouring bars are provided with at least one bore across the intermediate portion of said neighbouring bars, said bore being positioned in said plurality of neighbouring bars such that a rod is allowed to be introduce through the bore of the plurality of neighbouring bars.

Hereby, a stable inlet screen, is achieved while also allowing the bars to be heated.

Suitably, said distance holding member is hollow and is positioned between neighbouring bars and in front of the bore of the neighbouring bars in such a way that said rod is allowed to be introduced inside the hollow distance holding member, and in such a way that the distance holding member is supported toward said intermediate portion of neighbouring bars.

Preferably, said space extends from the proximal portion of said bar to the distal portion of said bar, said bars being supported by an elongated support means arranged across the elongation of said bars at their distal portion, the distal portion of said bars being welded to said elongated support means in such a way that the space at the distal portion of said elongated bar is closed, said at least one electric heating member being provided with electric conductors, both of which being introduced into said space of said bar, wherein the proximal portion of said bars is provided with a top cover for housing said electric conductors.

Alternatively, said space and said further space extend from the proximal portion of said bar to the distal portion of said bar, said bars being supported by an elongated support means arranged across the elongation of said bars at their distal portion, the distal portion of said bars being welded to said elongated support means in such a way that the space and the further space at the distal portion of said elongated bar are closed, said at least one electric heating member being provided with electric conductors, both of which being introduced into any one of or both or said space and said further space of said bar, wherein the proximal portion of said bars is provided with a top cover for housing said electric conductors.

Hereby is achieved that the space or spaces can be filled with a liquid containing an anti-freezing agent can be added, and such that the liquid does not evaporate from sad space of spaces.

Suitably, the exterior of said bar is provided with a sensing means, the at least one electric heating member being operated in response to said sensing means.

Hereby is achieved a possibility of sensing the temperature on the outside of the bars to save energy by disconnecting the electric heating member or members from electricity at temperatures when heating is not needed.

Alternatively, or in addition, one of said space and said further spaces is provided with said at least one electric heating member, wherein the other one of said first and second spaces is provided with a sensing means, the at least one electric heating member being operated in response to said sensing means.

Hereby is achieved a possibility of sensing the temperature on the inside of the bars to save energy by disconnecting the electric heating member or members from electricity at temperatures when heating is not needed.

Preferably, said sensing means comprises at least one sensing member, said sensing member comprising at least one of a conductive sensor and a temperature sensor, or a combination thereof.

Suitably, said sensing means is arranged substantially at the upstream region of said bar, said sensing member comprising a conductive sensor.

Alternatively, or in addition, said sensing means is arranged substantially at the downstream region of said bar, said sensing member comprising a conductive sensor.

Hereby, an efficient way of keeping track of the formation of frazil ice is achieved, and to more efficiently controlling the electric heating means.

Suitably, the cross-section of at least one of said bars has a substantially aerodynamic profile.

The aerodynamic profile is optimal as regards flow of water trough the inlet screen and a low build-up of frazil ice on and between the bars. However, the cross-section of the bars may instead be rectangular, square, circular or a cross-section not having a perfect aerodynamic shape.

Preferably, said bar is made of an extruded polymer or a light metal, wherein said extruded metal comprises a light metal or steel.

Hereby, manufacture of the bars can be achieved at low cost.

The light metal may comprise aluminium or titanium. It may alternatively comprise an alloy of any light metal, such as aluminium or titanium. Likewise, the steel to be extruded may be an alloy of steel suitable for extrusion.

It is however contemplated that the bar may instead be made of any kind of metal not suitable for extrusion. More particular, the bar may instead be made of stainless steel, and the spaces may be machined, e.g. by drilling or milling.

Suitably, the lateral dimension of said space is larger than the lateral dimension of the electric heating member, creating at least one gap between the space and the electric heating member for receiving a substance, said substance being one of a granular material and a liquid, or a combination thereof.

Preferably, said granular material sand or iron fillings.

Suitably, said liquid is one of an anti-freezing agent and water or combination thereof. Hereby is achieved a possibility to add e.g. sand or water, optionally with added anti-freezing agent, in the gap between the electric heating member and the bar.

DRAWING SUMMARY

In the following, the invention will be described in more detail with reference to the appended drawings, in which FIG. 1 illustrates a hydropower plant provided with inlet screens;

DETAILED DESCRIPTION

Figure 1:
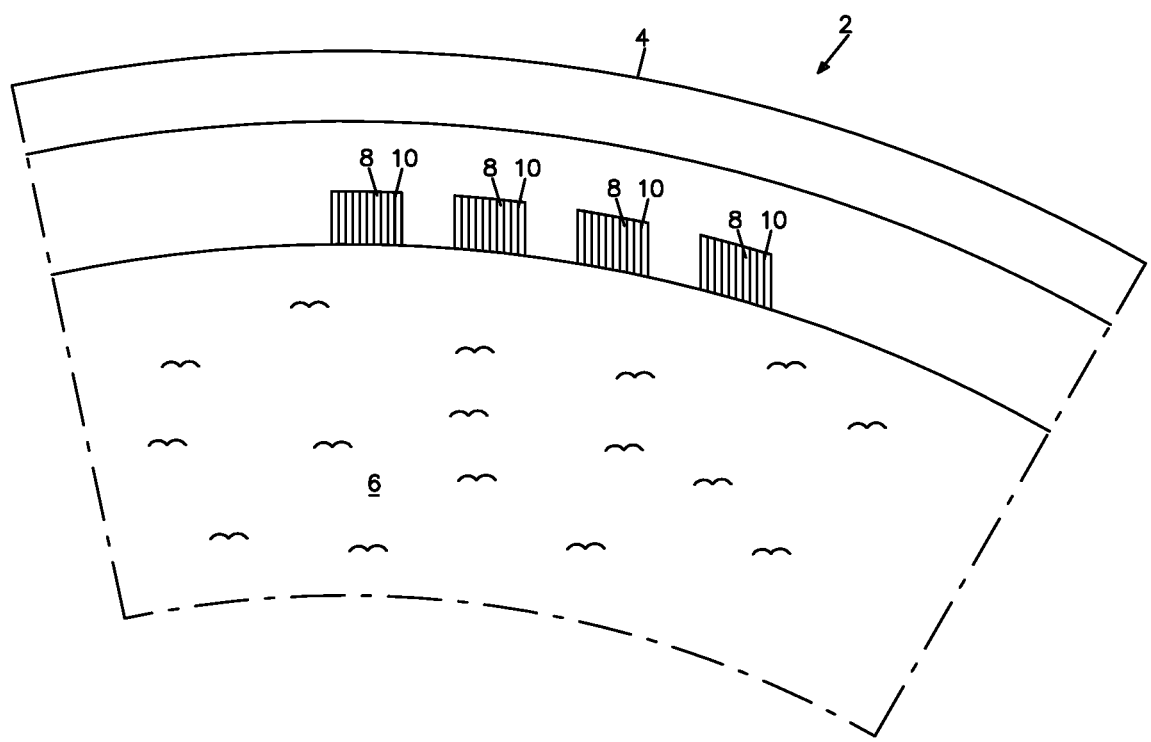

FIG. 1 shows a hydropower plant 2 comprising a dam wall 4 to hold water 6. Four water inlets 8, partly immersed in water, are provided with an inlet screen 10, respectively, for preventing objects of a predetermined minimum size to enter the water inlet 8.

Figure 2:
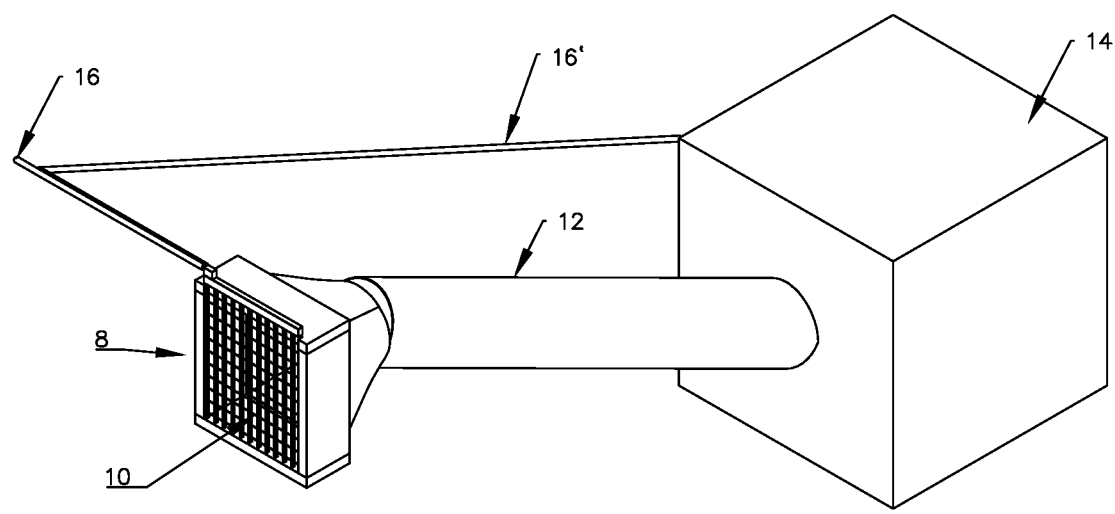
FIG. 2 illustrates one of the inlet screens shown in FIG. 1 in front of a sluice and a turbine housing.

FIG. 2 shows the water inlet 8 of a sluice 12 leading to one of four housings 14, each incorporating a not shown turbine driving a not shown generator, and a not shown outlet for the water leaving the turbine. Of course, the number of housings with a turbine depends on the size of the hydropower plant. Thus, the number of housings with a turbine may be less than four, e.g. one two or three, or more than four, e.g five, six or more. There may also be more than one turbine arranged in one housing.

The inlet screen 10 covering the water inlet 8 is provided with an electric power supply in the form of electric supply lines 16, 16' to supply electricity to an electric heating means 31 (cf. below).

The electric supply line 16 is connected to an electric circuitry other than that of the hydropower plant 2, while the electric supply line 16' is connected directly to the generator inside the housing 14, or to a neighbouring housing.

Figure 3A:
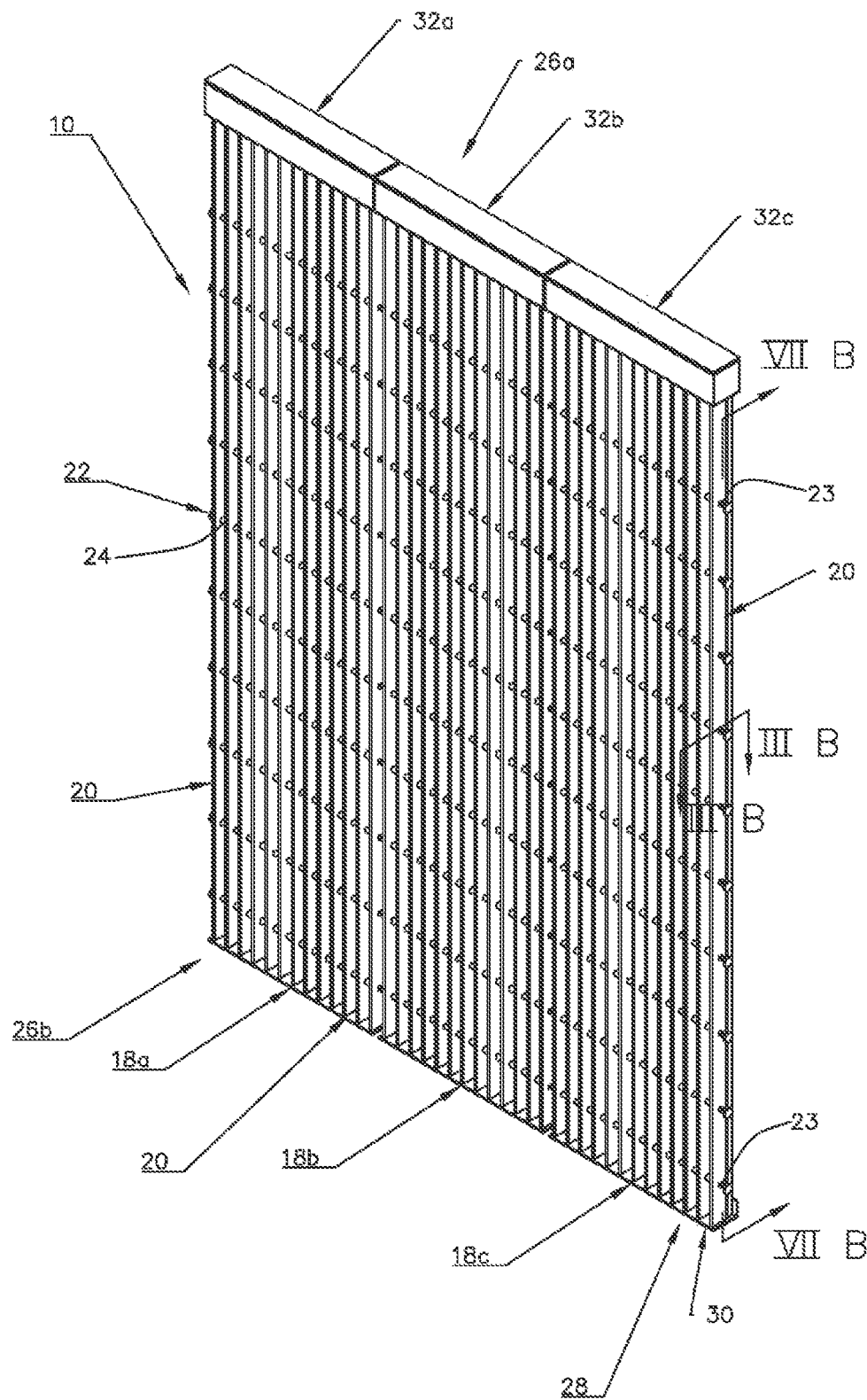
FIG. 3A is a perspective view of an inlet screen comprising parallel bars.

FIG. 3A shows in a perspective view the inlet screen 10 having three sections 18a, 18b, 18c, each section provided with twelve bars 20 arranged in a parallel relationship by means of distance holding means 22. The distance holding means 22 also add to the stability of the inlet screen 10.

The distance holding means 22 shown in FIG. 3A comprises ten rows of distance holding members 24 for reducing lateral movement of the elongated bars during freezing due to expansion of water at phase shift to ice. In order to further strengthen the distance holding means 22, a rod 23 extends through each of said rows of hollow distance holding members 24 and through a bore 38b (see FIG. 3B) extending through and across the longitudinal extension of the bars.

Of course, the number of rows of distance holding members may be more than ten or less than twelve, depending on the size of the water inlet 8 to be covered by the inlet screen 10. Each bar 20 has a proximal portion 26a and a distal portion 26b.

It is contemplated that the distance holding means 22 may comprise a frame, in addition to or instead of the distance holding members 24, depending on the size of the screen.

The distal portion 26b of the bars 20 are supported by a support means 28 in the form of an elongated profiled element 30.

Each section 18a, 18b, 18c is at the proximal portion 26a of the bars 20 provided with a top cover 32a, 32b, 32c covering an electric heating means 31.

Figure 3B:
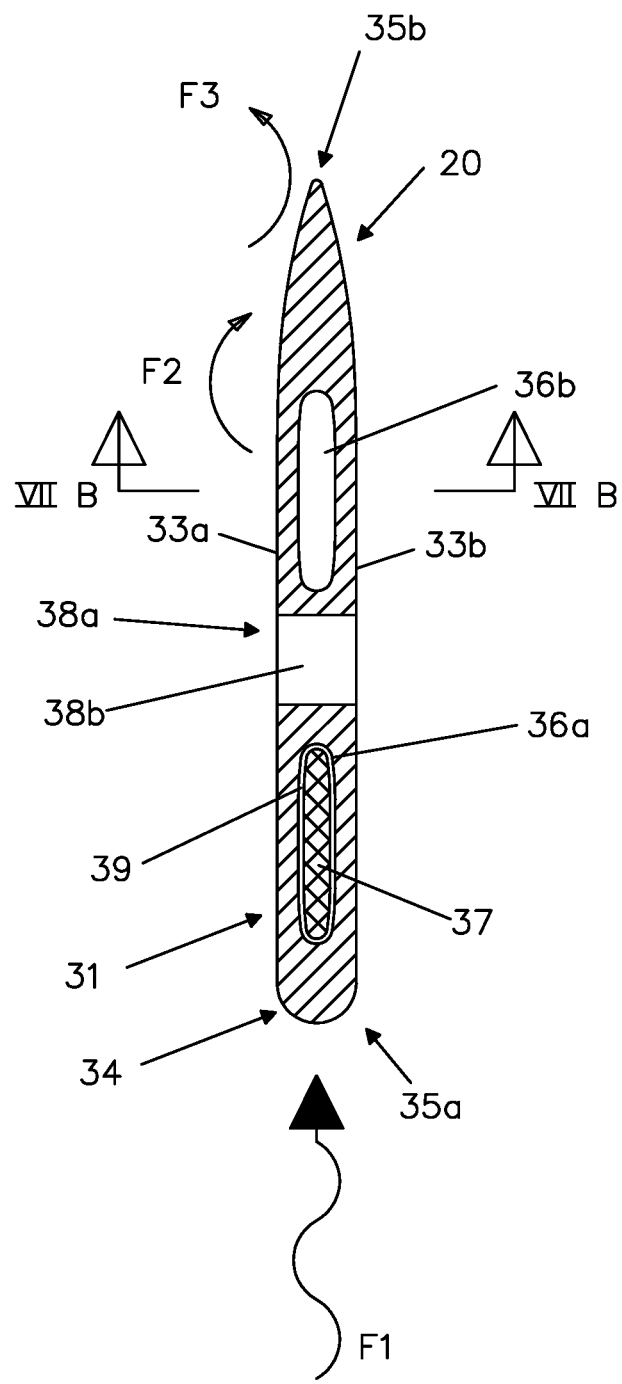
FIG. 3B is a cross-section of the bar as such of the inlet screen shown in FIG. 3A along line IIIB-IIIB and provided with an electric heating member.

In FIG. 3B is shown cross-section along lines IIIB-IIIB of the rightmost bar 20 of the inlet screen 10 of FIG. 3A.

The bar 20 is an extruded aluminium profile 34, the cross-section of which having an aerodynamic profile, with two elongated side-walls 33a, 33b, said side-walls 33a, 33b being substantially parallel and ending in one direction at an upstream region 35a being rounded and in the opposite direction at a downstream region 35b being pointed. The pointed downstream region 35b is somewhat rounded, however sharper than that of the rounded upstream region 35a. The arrow $F_1$ indicates the flow direction of the water, while the arrows $F_2$ and $F_3$ indicate the flow at the separation point.

It should be noted that the side-walls 33a, 33b may be converging from the upstream region 35a towards the downstream region 35b.

The bar 20 also defines two spaces 36a, 36b in the longitudinal extension of the bar 20, the space 36a being arranged upstream the space 36b.

In an intermediate portion 38a of the cross-section of the bar 20, i.e. between the two spaces 36a, 36b, a bore 38b is provided for allowing said bar to extend through the row of adjacent bars (cf. FIG. 3A). The distance holding members rest against the sides of the intermediate portion 38a of the bar 20.

Even though it is preferable that the bar is made of an extruded aluminium profile 34, the material of the bar may be any a light metal possible to extrude, such e.g. titanium, or any polymer possible to extrude, such as HDPE. Thus, when producing the spaces 36a, 36b in a light metal or a polymer suitable for extrusion, the spaces are achieved directly during the extrusion process. The spaces 36a, 36b will then become through-holes during the extrusion process. Surface coating may be added in order to facilitate removal of ice.

On the other hand, it would also be possible to produce the bar in steel or wood.

The aerodynamic profile of the bar 20 would however be more cumbersome and expensive to produce in steel or wood. When producing the spaces 36a, 36b in steel or wood (or aluminium), a drill or a milling tool is preferably used.

Inside the space 36a, an electric heating means 31 comprising at least one electric heating member 37 is arranged. The electric heating means 31 is electrically connected to an electric power supply (cf. FIG. 1).

For production reasons, it is desirable that the electric heating members 37 have a smaller cross-section than that of the space 36a, causing a gap 39 of air between the interior surface of the space 36 and the electric heating member 37. However, air has a much lower thermal conductivity and heat transfer coefficient than liquids and granular material. For this reason, the gap 39 may be filled with a liquid or a granular material, such as sand or iron filings. If a liquid is chosen, water may be chosen, but preferably, the chosen liquid has a freezing point lower than the expected temperature of super-cooled water in the geographical area of the hydropower plant. For this reason, the liquid may be an anti-freezing agent, such as alcohol or ethylene glycol or a mixture of water and glycol. Another possible anti-freezing agent is a salt, such as NaCl mixed into water.

It should be noted that water mixes well with granular material. Thus, it would be possible to mix water or water containing an anti-freezing agent with a granular material.

If it turns out that it is not enough to provide space 36a with electric heating members, the empty space 36b may be provided with additional heating members.

Figure 4A:
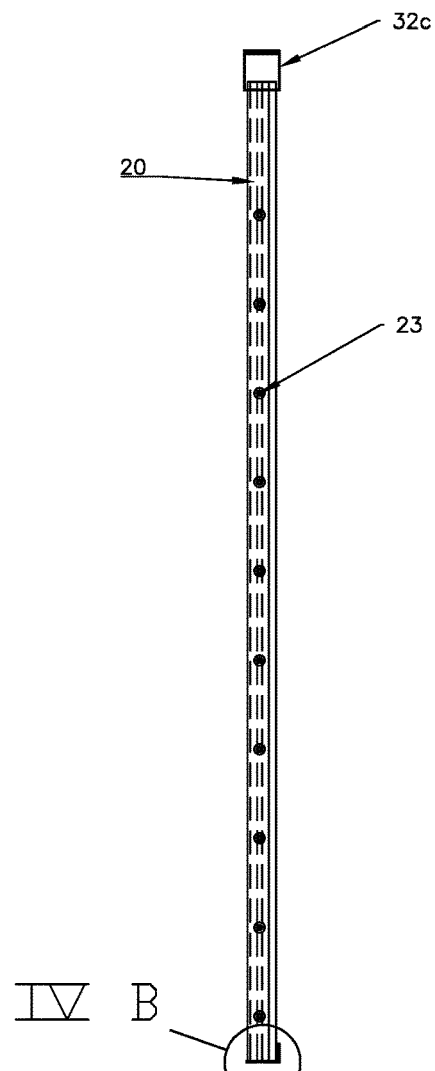
FIG. 4A is a side view of the inlet screen shown in FIG. 3A.

FIG. 4A is a side view of the inlet screen 10 showing the rightmost bar 20 and the rightmost top cover 32c of FIG. 3A, and furthermore, the ten rows of bars 23 and distance holding members 24.

Figure 4B:
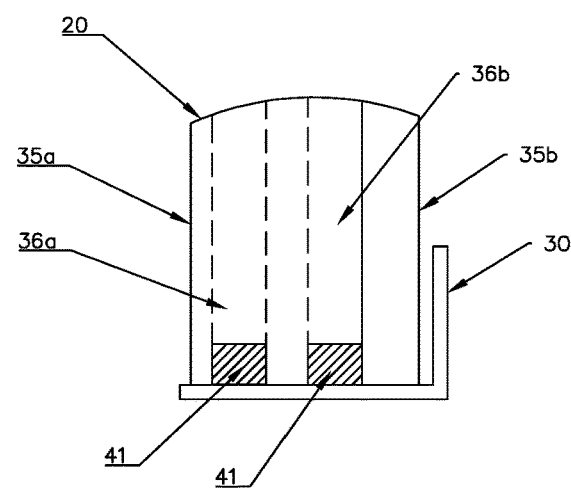
FIG. 4B is an enlargement of the portion inside the circle IVB indicated in FIG. 4A.

In FIG. 4B is shown an enlargement of the detail inside the circle IVB shown in FIG. 4A.

As already mentioned above, the distal portion 26b of each bar 20 is supported by a support means 28 in the form of an elongated profiled element 30. The cross-section of the profiled element 30 has the form of an "L". However, any other form may be possible, such as U-shape, I-shape or H-shape.

As can be understood from FIG. 4B, the spaces 36a, 36b are covered by the profiled element 30, such that the spaces are closed. An optional closing member 41 may be added at the distal portion 26b of the spaces 36a, 36b, since they are through-holes in the longitudinal extension of the bar 20 formed during the extrusion process. Alternatively, or in addition, the bars 20 may be welded towards the profiled element 30, also serving as support for the bars 20.

Of course the spaces 36a, 36b may be manufactured by drilling or milling instead, in particular if another material, such as steel, wood, or a polymer not suitable for extrusion is chosen. When drilling, it would thus be possible to directly form a blind hole during the drilling operation, instead of covering a space at the distal portion of the bar 20. It would of course be possible to drill the blind holes in a bar 20 made of aluminium or a polymer such as HDPE as well, even though extrusion would be preferable.

Figure 5A:
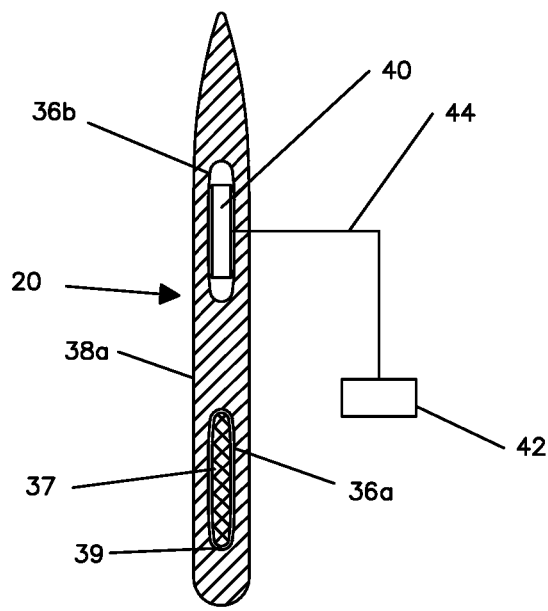
FIG. 5A illustrates schematically a bar of the inlet screen shown in FIG. 3A provided with a sensing means and a control means.

FIG. 5A shows the bar 20 as described in connection with FIG. 3B, however not only provided with an electric heating member 37 inside the first space 36a, creating a gap 39, but also a sensing means 40 inside the second space 36b. It is schematically shown that the sensing means 40 is connected to a control means 42 via a cord 44. The cord 44 of course extends along and inside the space to the inside of the top cover 32a, 32b, 32c, where the control means may be arranged. The control means 42 may instead be arranged inside the dam wall 4 to protect it from humidity. Of course, sensing means 40 may be connected to the control means wirelessly instead.

Figure 5C:
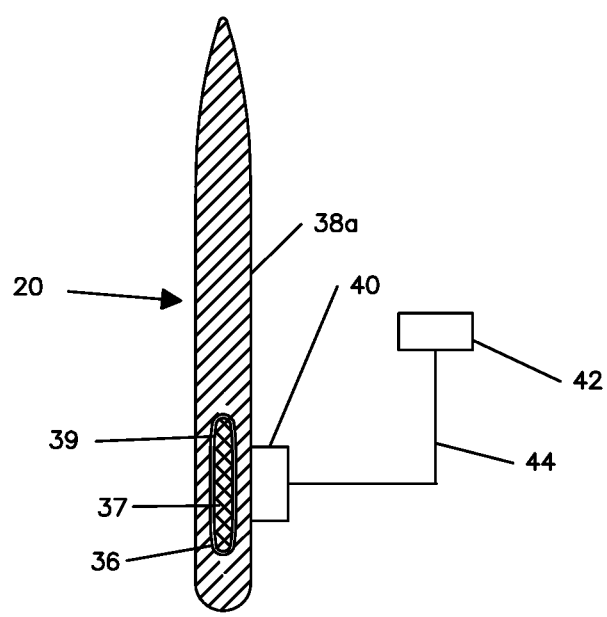
FIGS. 5B-5C illustrate schematically an alternative bar provided with a sensing means and a control means.
Figure 5B:
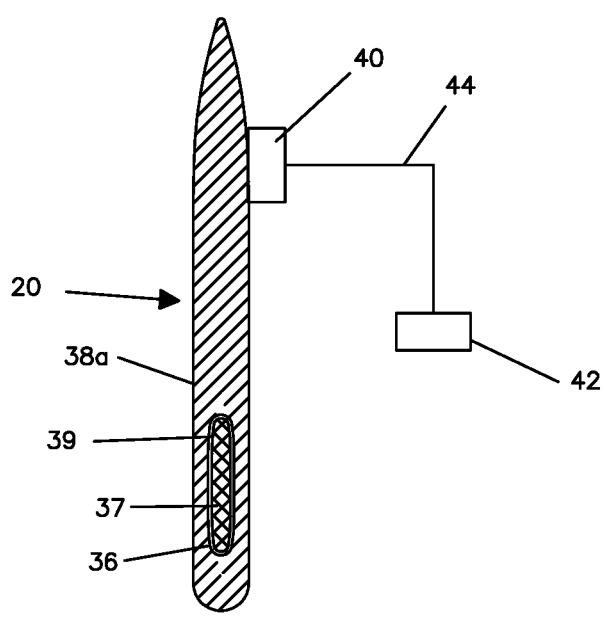

As shown in FIG. 5B, it would be possible to provide the bar 20 shown in FIG. 3B with one space 36 only provided with an electric heating member 37, together creating said gap 39. In that case, it would be possible to arrange the sensing means 40 on the exterior of the bar 20.

FIG. 5C shows an alternative position for the sensing means 40, i.e. at the upstream region of the bar 20. In case the sensing means 40 is a capacitive sensor, it is important that it is arranged where the frazil ice is first accumulated (cf. FIG. 8). This will be discussed in further detail below. Of course, a capacitive sensor may be used for sensing accumulation of frazil ice at the downstream region of the bar 20. Alternatively or in addition, be a temperature sensor may be used.

Figure 6A:
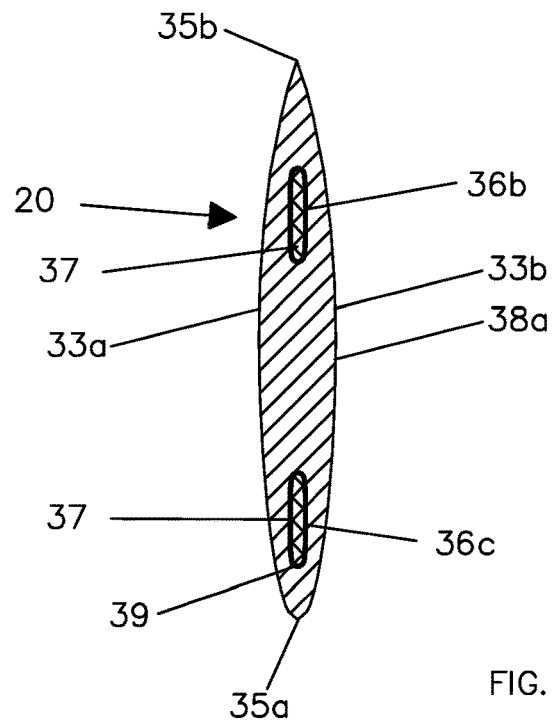
FIGS. 6A-6H illustrate bars having alternative configuration of their cross-section.

FIG. 6A shows a variant of the bar 20, the side-walls 33a, 33b of which being convex/convex in relation to one another, resulting in a cross-section having a double pointed shape. However, the pointed downstream region 35b is relatively sharp, and is less rounded than that of the pointed upstream region 35a. The bar 20 is provided with three spaces 36a, 36b, each provided with an electric heating member 37, forming said gap 39 between each electric heating member 37 together with the space 36a, 36b.

Figure 6B:
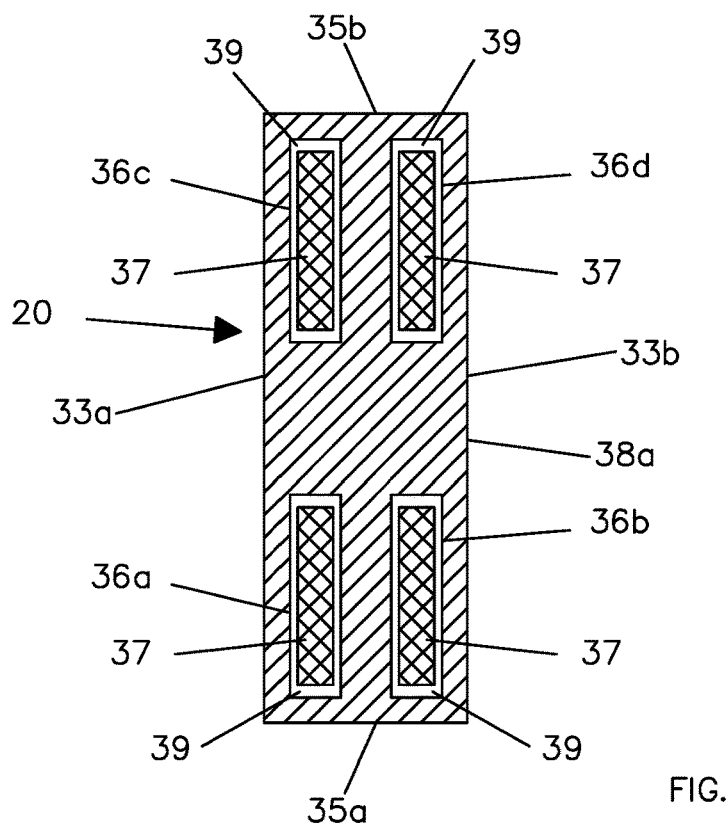

FIG. 6B shows another variant of the bar 20, having a rectangular cross-sectional shape, i.e. the side-walls 33a, 33b are flat and parallel to one another. Likewise, the upstream region 35a and the downstream region 35b are flat and parallel to one another, and perpendicular to the side-walls 33a, 33b. The bar 20 is furthermore provided with four spaces 36a, 36b, 36c, 36d of rectangular cross-section, each provided with an electric heating member 37, forming said gap 39 together with its respective space 36a, 36b, 36c, 36d.

Figure 6C:
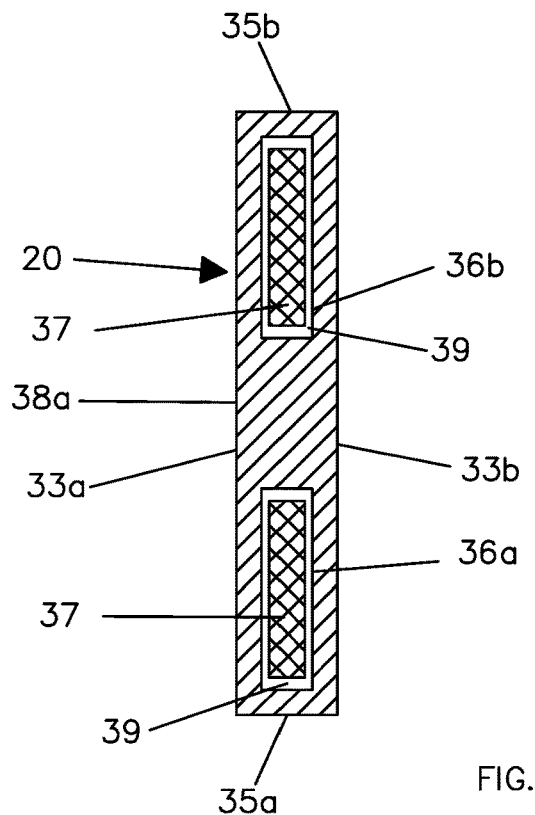

FIG. 6C is a variant of the bar 20 shown in FIG. 6B. Also the bar 20 of this variant has a rectangular shape, provided with two spaces 36a, 36b of rectangular cross-section, each being provided with an electric heating member 37, forming said gap 39 together with its respective space 36a, 36b.

Figure 6D:
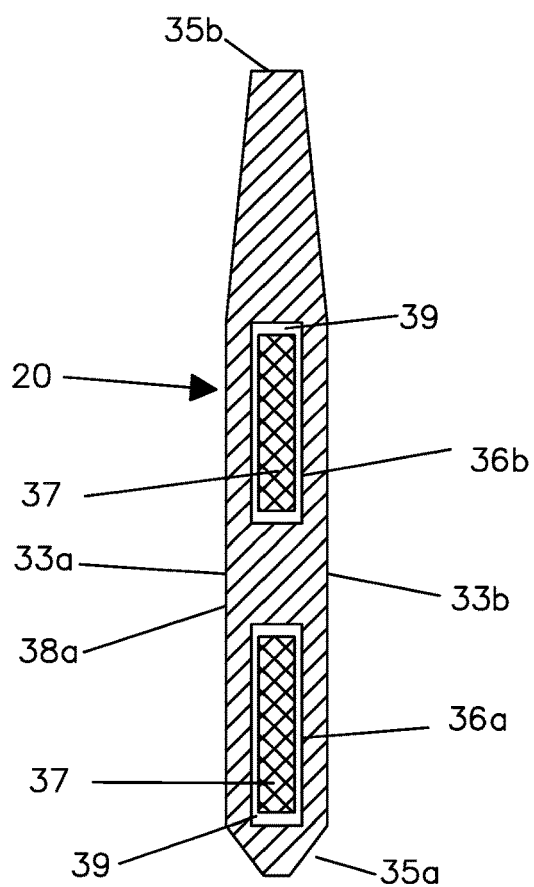

A variant of the bar 20 of FIG. 3B is shown in FIG. 6D. The cross-section of bar 20 according to this variant has an upstream region 35a and a downstream region 35b. However, according to this variant the upstream region 35a is bevelled from both parallel side-walls 33a, 33b towards said upstream region 35a. Furthermore, the bar 20 is bevelled from said parallel side-walls 33a, 33b towards said downstream region 35b. The upstream region 35a and the downstream region 35b is flat, respectively. Both flat ends are parallel to one another and substantially perpendicular to said parallel side-walls 33a, 33b.

Figure 6E:
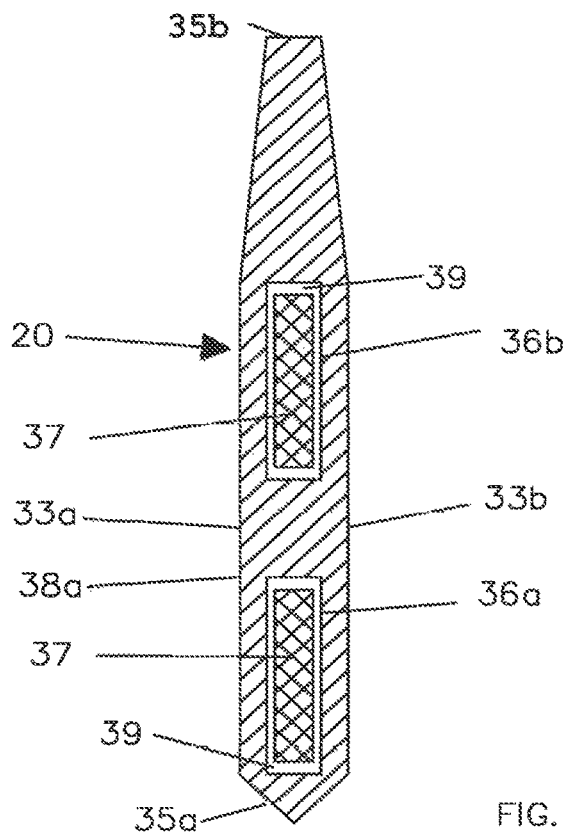

A variant of the bar 20 of FIG. 6D is shown in FIG. 6E. According to this variant the cross-section of the upstream region 35a of the bar 20 is bevelled from both parallel side-walls 33a, 33b towards the upstream region 35a to a pointed configuration. Also in this variant, the bar 20 is provided with two spaces 36a, 36b of rectangular cross-section, each being provided with an electric heating member 37, forming said gap 39 together with its respective space 36a, 36b.

Figure 6F:
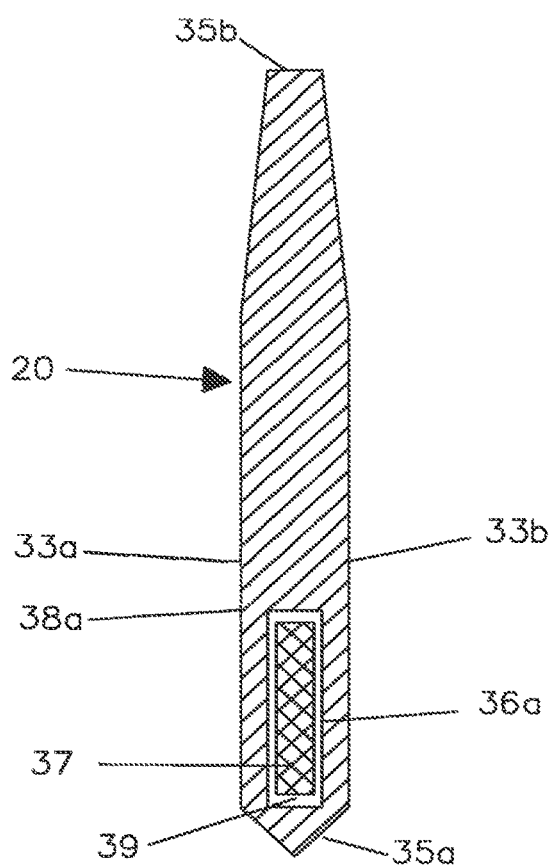

A variant of the bar 20 of FIG. 6E is shown in FIG. 6F. According to this variant, the bar 20 is provided with a single space 36a of rectangular cross-section and further provided with an electric heating member 37, forming said gap 39 together with the space 36a.

Figure 6G:
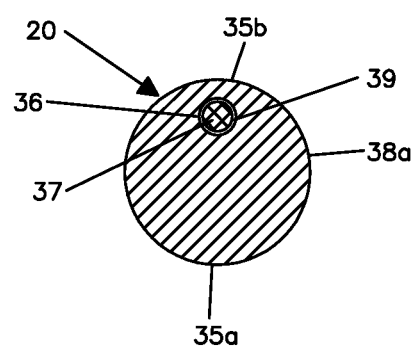

FIG. 6G shows yet another alternative, according to which the cross-section of the bar 20 has a circular cylindrical shape and an off-set space 36 having a circular cross-section. The space 36a is provided with an electric heating member 37, together forming said gap 39.

Figure 6H:
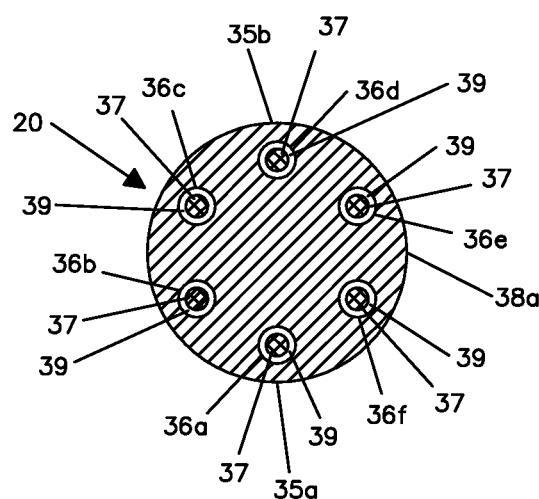

Furthermore, FIG. 6H shows an alternative configuration of the bar 20 having a circular cylindrical shape and seven spaces 36a-36g, each provided with an electric heating member 37, forming said gap in its respective space, each of said spaces having a circular shape.

It should be understood that all of the bars of FIGS. 5A-5C and 6A-6H are to be provided with the bore 38b shown in FIG. 3B in an intermediate portion of the bars between the upstream region and the downstream region. It is important that the bar does not extend through the space 36; 36a, 36b, etc. In case of two spaces, 36a, 36b, the bore 38b is preferably arranged between the spaces 36a, 36b. In case of a single space 36, the space is arranged off-set (cf. FIGS. 5B, 5C, 6F and 6G), while the bore 38b is preferably arranged centrally in the intermediate portion. In case of three or more spaces 36a, 36b etc (cf. FIG. 6B or 6H), the bores 38b are preferably placed between groups of spaces.

Figure 7A:
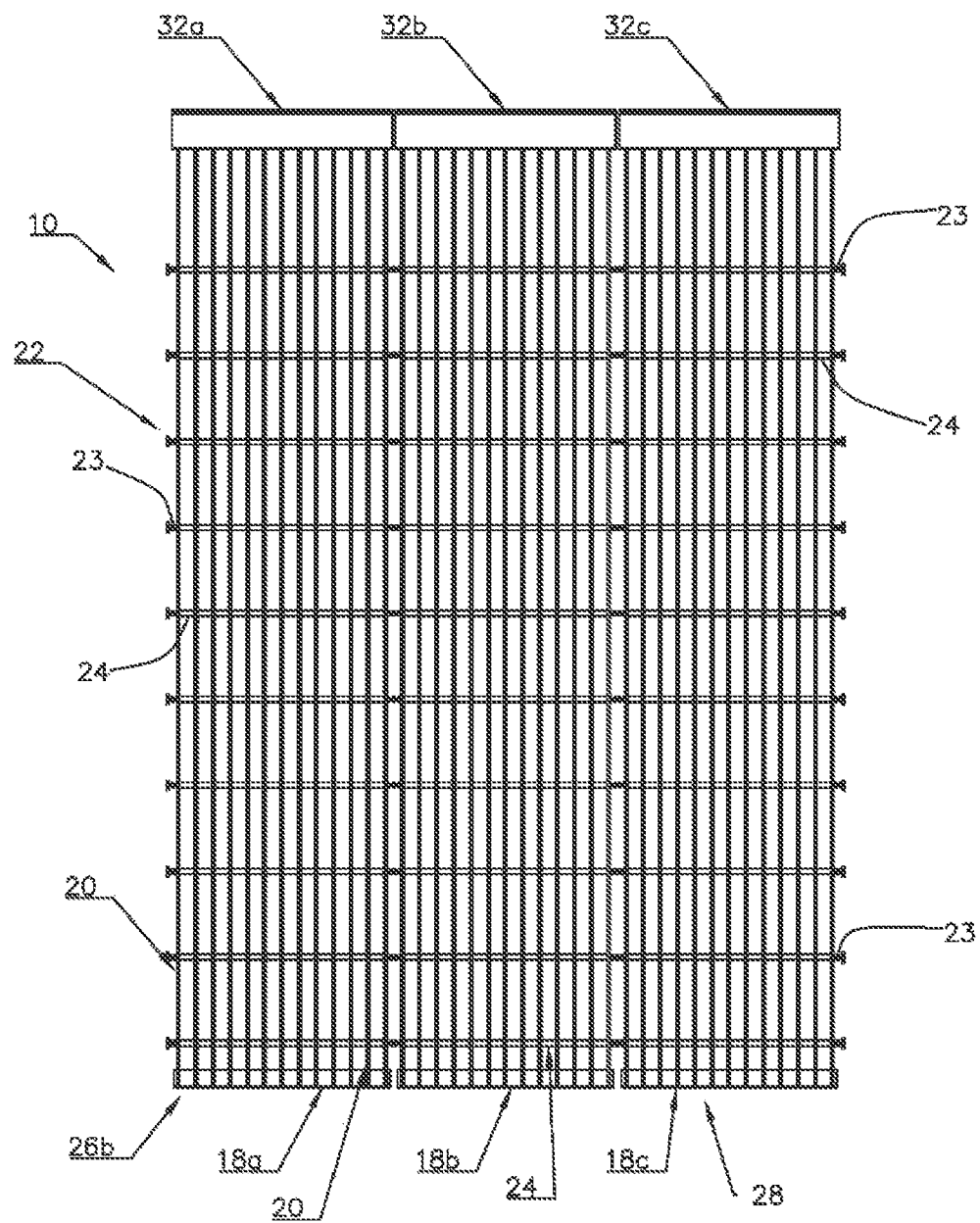
FIG. 7A is a front view of the inlet screen shown in FIG. 3A.

FIG. 7A is a front view of the inlet screen 10 shown in FIG. 3A.

Figure 7B:
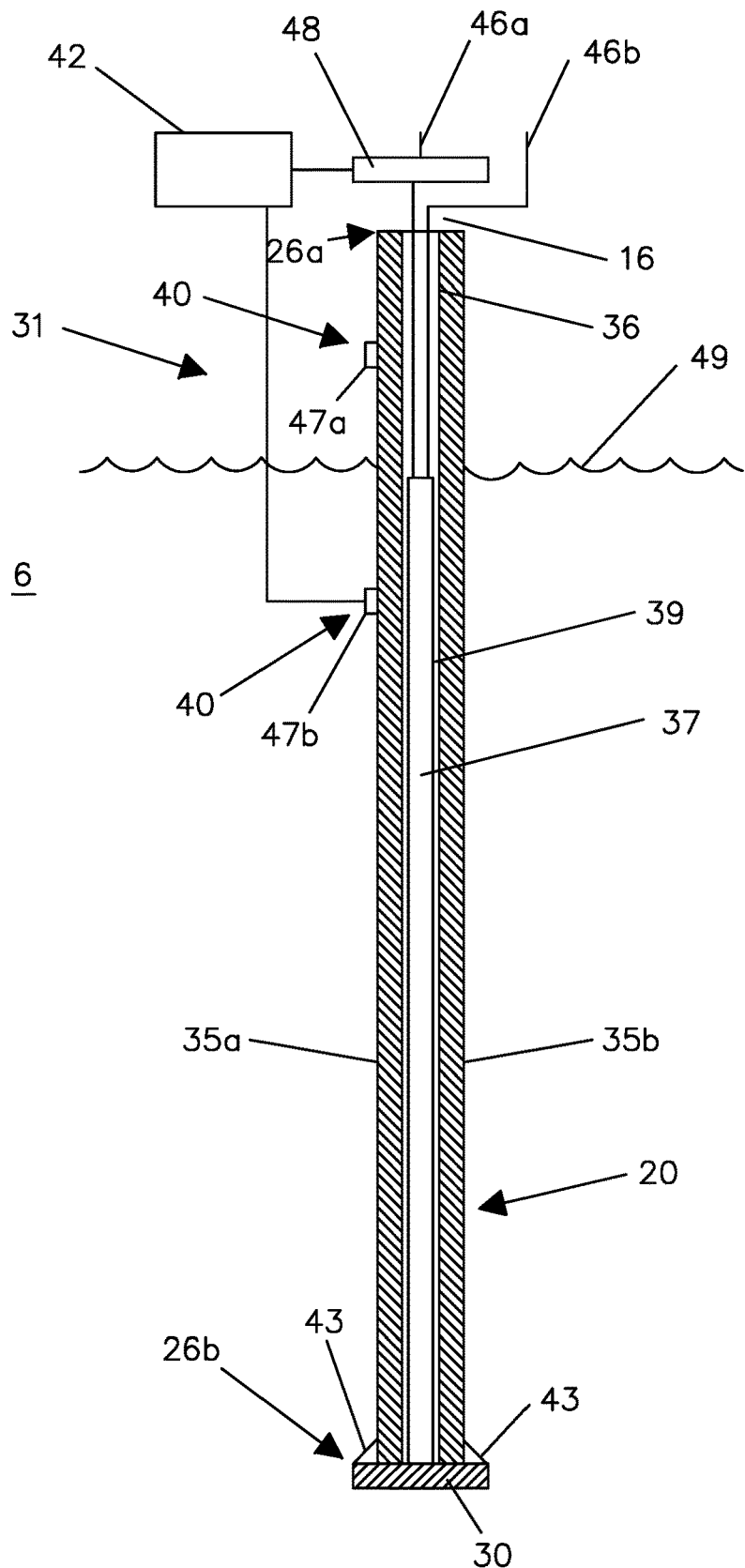
FIG. 7B is a cross-section of a bar of the inlet screen shown in FIG. 3B along line VIIB-VIIB and provided with an electric heating member.

In FIG. 7B the rightmost bar 20 is shown in cross-section along the line VIIB-VIIB indicated in FIG. 3A, however with the bar 20 of FIG. 6G. The arrow F in FIG. 7B indicates the flow direction of the water.

The bar 20 is provided with a central space 36 covered at its distal portion 26b by a profiled element 30, in this case of a rectangular cross-sectional shape. The electric heating means 31 comprises—inside the space—an electric heating member 37 to be arranged underneath the water level. The electric heating member 37 is connected to electricity via the electric supply line 16 (see FIG. 1) having two electric conductors 46a, 46b, both leading to the proximal portion 26a of the bar 20, underneath the top cover 32a, 32b, 32c (cf. FIG. 3A). Also in this case, the profiled element may instead have an L-shape, U-shape, I-shape or H-shape.

The electric heating member 37 and the space 36 define together said gap 39.

A welding seam 43 connects the bar 20 towards said profiled element 30 in such a way that a sealing is created, such that a liquid, a granular material or a mixture thereof (cf. above in connection with FIG. 3B) does not leak out of the space 36, and/or stopping surrounding water from flowing into the space 36.

The electric heating means 31 furthermore comprises control means 42 including a sensing means 40 comprising a first the sensing member 47a connected wirelessly to said control means 42 and a second sensing member 47b, connected by wire to said control means 42. The control means controls a relay 48 to switch on or off the electricity for the electric heating member 37 in response to the sensing means 40. Of course, the first sensing member 47a may be connected by wire to the control means 42. Likewise, the second sensing member 47b may be wirelessly connected to the control means 42. The first sensing member 47a is arranged above the water surface, while said second sensing member 47b is arranged underneath the water surface.

The sensing means 40 preferably comprises at least one capacitive sensor, even though a temperature sensor means may be used instead. However, since the use of capacitive sensor has been proven to be a more reliable method for detecting frazil ice, temperature sensors may rather be used in addition to capacitive sensors.

Capacitive sensors sense the dielectric properties of material in front of the sensor. Thus, it is able to sense the difference of the dielectric properties of air, water and ice. Frazil ice accumulates generally on the upstream region of the bars (cf. FIG. 8). Thus, the capacitive sensors are preferably mounted at the upstream region 35a of the bar 20.

Alternatively, it would be possible to use a bar 20 having the cross-section according to the variants of FIGS. 6A-6E and 6H. The first and second sensing members 47a, 47b may be arranged on the outer surface at the upstream region of the bar. Alternatively, the electric heating member 37 closest to the upstream region 35a of the bar 20, i.e. in space 36a, is removed, and the sensing member 47a is arranged inside space 36a.

In case two or more sensing members 47a, 47b are used, they may be arranged at different locations inside said space 36a. Thus, the first and second sensing members 47a, 47b may be positioned at a distance from one another inside said space 36a, such that the when the bar 20 is arranged vertically in front of the water inlet 8—and the water level in the dam is such that water flows into the water inlet 8—the first sensing member 47a will be arranged inside the bar 20 above the water surface, while the second sensing member 47b will be arranged inside the bar 20 below the water surface, however still inside of the bar 20. This also relates to the embodiment of FIGS. 5A-5C and FIG. 7B.

A combination of internal and external sensors would of course also be possible.

Of course, capacitive sensors arranged in or on neighbouring bars 20 may cooperate to sense whether there is accumulation of frazil ice.

The electric heating member 37 is arranged inside the bar 20 underneath the water surface 49. The proximal portion 26a of the bar 20 may be closed by a removable lid or a stopper. In this connection, it is noted that the portion of the bar 20 extending from the water level and upwards may be omitted. Thus, the removable lid or stopper would then be arranged at the proximal portion 26a of the bar 20 right above the water level.

It should be noted that the electric heating means 31 may alternatively comprise a plurality of electric heating members 37 arranged above one another. In that case, further sensing members may be mounted underneath the water level at a distance from and above one another on the upstream region 35a of the bar 20 in front of the respective plurality of electric heating member 37. Hereby, separate electric connection and disconnection of the plurality of electric heating elements 37 arranged above one another may be performed in response to the respective sensor. This would save large amounts of electricity compared to the use of a single electric heating member extending the whole elongation of the bar.

Furthermore, it would be possible to control the number of electric heating members 37 to be turned on or off in response to a the sensing members 47a, 47b, since they may also sense the water level of the dam, such that only the electric heating members 37 underneath the water level are heated, and in particular if there is no or only little frazil ice accumulation on the bar 20 above the water level.

Figure 8:
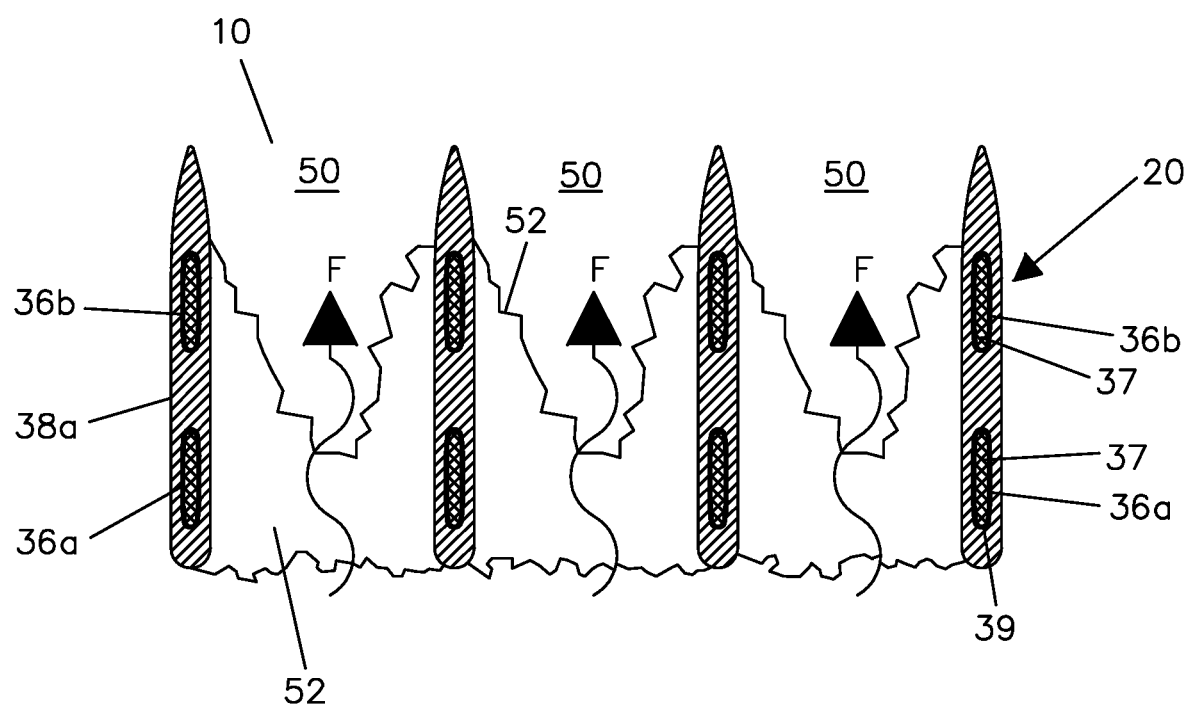
FIG. 8 illustrates accumulation of frazil ice on bars of the inlet screen shown in FIG. 2.

FIG. 8 shows a portion of the inlet screen 10 indicated by four bars 20, each provided with two spaces 36a, 36b. The sensing means 40 has been omitted for facilitating understanding of the figure, but is preferably be placed on the exterior surface of one or more at the upstream region of the bar 20. The inlet screen 10 is provided with an electric heating means 31 (see FIG. 7B) comprising at least one electric heating member 37 in each space 36a, 36b of each bar 20. As in all embodiments described above, the electric heating member 37 and the space 36a and 36b, respectively, define together said gap 39.

Also in this case, it would be possible to put a sensing means inside the bar 20.

Of course, depending on the winter climate conditions where the hydropower plant is or is to be situated, it would be possible to provide some bars 20 of the inlet screen 10 with two electric heating members 37 and some with only one electric heating member 37. It would likewise be possible to provide only some of the bars 20 with electric heating members 37, while leaving some bars 20 without electric heating members.

A passage 50 is defined between the bars 20, and arrows F indicate water flow through the passages 50, e.g. in the summer.

FIG. 8 also shows accumulation of frazil ice 52 causing complete blockage of the passage 50 at super-cooling conditions. By connecting the electric heating means 31 to electricity at super-cooling conditions, it is possible to reduce the risk for a complete blockage of the passage 50. It should be noted that the build-up of ice certainly starts at the surface and grows as shown in FIG. 8 in a sideward direction at the water surface, but also grows downwards along the longitudinal extension of the bar 20 as far as the super cooling effect reaches. Down to that limit, the super cooling effect will also cause lateral build-up of ice on the bars 20 far down below the water surface.

Figure 9:
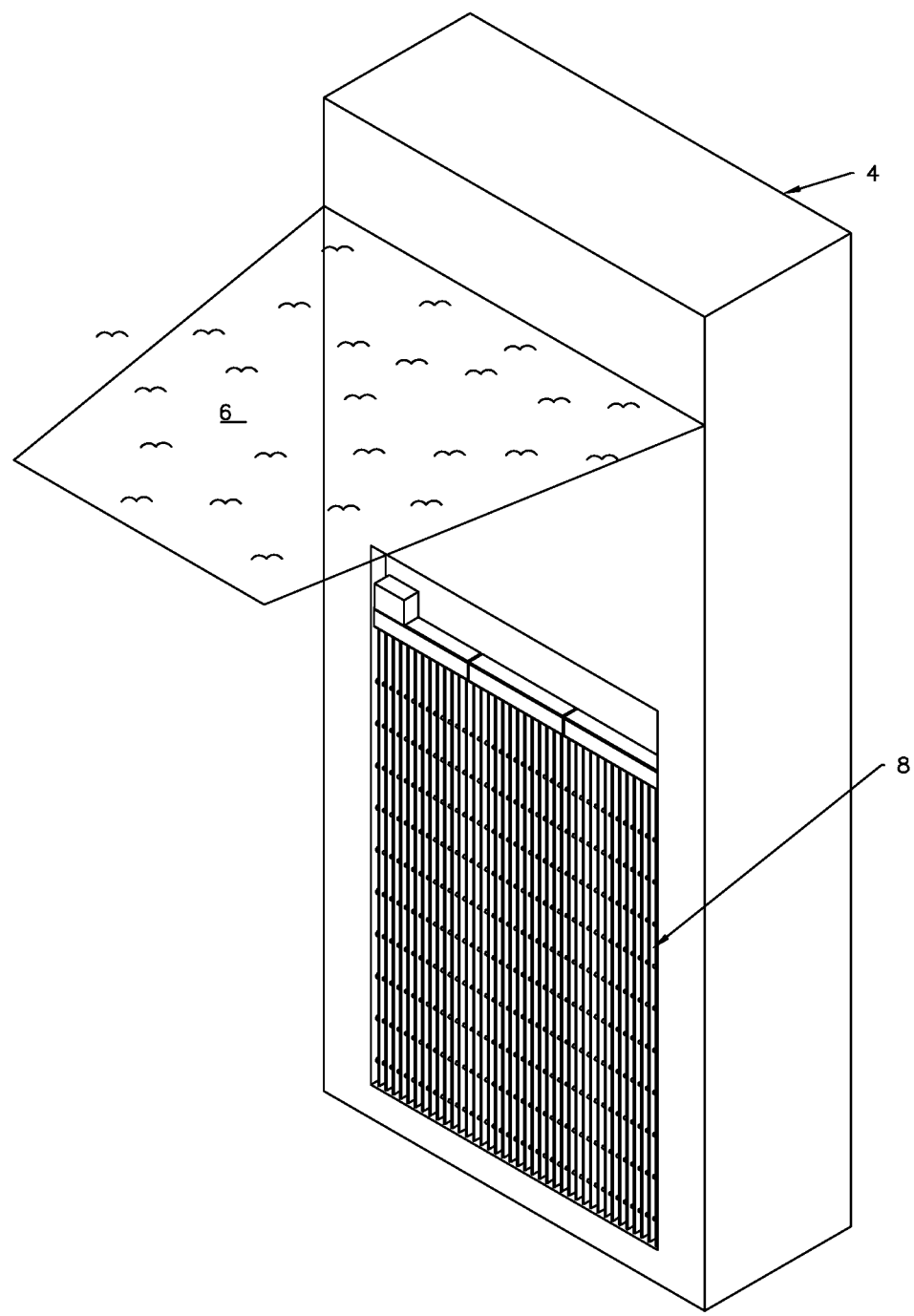
FIG. 9 illustrates a screen completely immersed underneath the water surface.

FIG. 9 shows a hydropower plant comprising a dam wall 4 to hold water 6. According to this embodiment, the water inlets 8 are completely immersed in water.

It should also be understood that the different shapes of the bars described above may be provided with a lower or higher number of spaces than described. Accordingly, the bar 20 shown in FIG. 5B may be provided with three spaces as shown in FIG. 5A or with four spaces as shown in the embodiment of FIG. 6B etc.

Thus, it should be understood that all different embodiments of electric heating means 31 described above may be connected to a control means 42 controlling a relay to switch on and off in response to the sensing means 40, provided inside or exterior of the bar. In all described embodiments, the sensing means 40 may be a capacitive sensor. In addition, or alternatively, the sensing means 40 may be a temperature sensor.

Of course, in all the above described embodiments, the gap 39 may be filled with a liquid, such as water or a mixture of water and an anti-freeing agent such as glycol or salt, or a granular material, such as sand or iron filings in order to raise the heat transfer coefficient from the electric heating member 36 to the bar 20.

It is preferred that heating of the bars is initiated before frazil ice starts to accumulate on the bars, since thermal conductivity of ice is low. Thus, if heating of the bars is initiated after accumulation of frazil ice has started, more electric effect is needed to remove the frazil ice from the bars, than what would be needed to just prevent frazil ice from accumulating on the bars. In order to accomplish this, the temperature of the water close to the bars needs to be slightly more than 0°.

Example

In a restricted area of a hydropower plant in Norway, an inlet screen having prior art electrically heated metal bars was mounted in front of the water inlets. The prior art bars were provided with resistance electrodes connected to a source of electricity, i.e. the prior art bars were directly heated by the resistance electrodes. The length of the metal bars was 12 meters. About 8 meters of the bars were arranged vertically below the water surface of the dam, while 4 meters of the bars were arranged above the water surface.

In order to remove frazil ice, the necessary electric effect was 1.5 MW.

In the same restricted area of the hydropower plant, the prior art bars were exchanged for the bars 20 according to the invention, and were thus installed in front of the water inlets 8 of the same hydropower plant. The bars 20 according to the invention were also 12 meters long and extended 8 meters vertically below the water surface. Electric heating members 37 and a liquid containing anti-freezing agent based on glycol were provided in the spaces of the bars 20, such that the electric heating members heated the liquid to 100° C. In turn, the liquid heated the bar, i.e. the bars 20 were indirectly heated. Hereby, a smooth heating of the bars was achieved.

A surprising effect occurred in that the maximum necessary effect to remove frazil ice was lowered to 200 kW, i.e. only 13% of what was necessary with the prior art bars.

The reason that the prior art bars needed much more electric effect was the large losses of heat to the dam and to the ground.

In the figures, the bars 20 are placed vertically in front of the water inlet. It should be however be understood that the bars 20 may be positioned horizontally or at any angle in relation to the vertical plane. The bars may also be arranged cross-wise in front of the water inlet, forming a grid.

REFERENCE SIGNS USED

F, $F_1$, $F_2$, $F_3$ Flow (arrow)
2 hydropower plant
4 dam wall
6 water
8 water inlet
10 inlet screen
12 sluice
14 housing
16, 16' electric supply line
18a-18c section
20 bar
22 distance holding means
24 distance holding member
26a proximal portion
26b distal portion
28 support means
30 profiled element
31 electric heating means
32a-32c top cover
33a, 33b side-wall
34 extruded aluminium profile
35a upstream region
35b downstream region
36, 36a-36g space
37 electric heating member
38a intermediate portion
38b bore
39 gap
40 sensing means
41 closing member
42 control means
43 welding seam
44 cord
46a, 46b electric conductor
47a first sensing member
47b second sensing member
48 relay
49 water surface
50 passage
52 frazil ice

The invention claimed is:

1. An inlet screen adapted to be arranged at the water inlet (8) of a hydropower plant (2), comprising a plurality of elongated bars (20), said bars (20) being separated by a distance holding means (22), each elongated bar (20) having in its elongation a proximal portion (26a) and a distal portion (26b), and in a cross-section an upstream region (35a) and a downstream region (35b), at least one of said bars (20) defining a first space (36; 36a) extending along at least a portion of an extension of said bar in a direction of elongation of said bar (20), said first space (36; 36a) being defined in either of the upstream region (35a) and the downstream region (35b), said elongated bar having an intermediate portion (38a), said intermediate portion (38a) being elongated and extending along the direction of elongation of the bar (20) from the proximal portion (26a) of said bar (20) to the distal portion (26b) of said bar (20) between the upstream region (35a) and the downstream region (35b), said bar (20) being provided with an electric heating means (31), said electric heating means (31) comprising at least one electric heating member (37) being introduced into said first space (36; 36a) wherein the cross-section of at least one of said bars has a substantially aerodynamic profile.

2. An inlet screen according to claim 1, wherein said bar defines a further space (36b) extending along at least a portion of the extension of said bar in the direction of elongation of said bar (20), said first space (36a) and said further space (36b) being spaced from one another, said space (36a) being defined in the upstream region (35a) and said further space (36b) being defined in said downstream region (35b), said intermediate portion (38a) extending along the direction of elongation of the bar between said first space (36a) and said further space (36b), said electric heating means (31) comprising at least one electric heating member (37) being introduced into any one of said first space (36a) and said further space (36b).

3. An inlet member according to claim 2, wherein said first space (36a) and said further space (36b) extend from the proximal portion (26a) of said bar (20) to the distal portion (26b) of said bar (20), said bars (20) being supported by an elongated support means (28) arranged across the direction of elongation of said bars (20) at their distal portion (26b), the distal portion (26b) of said bars (20) being welded to said elongated support means (28) in such a way that the first space (36a) and the further space (36b) at the distal portion (26b) of said elongated bar (20) are closed, said at least one electric heating member (37) being provided with electric conductors (46a, 46b), both of which being introduced into any one of or both or said first space (36a) and said further space (36b) of said bar (20), wherein the proximal portion (26a) of said bars (20) is provided with a top cover (32a, 32b, 32c)
for housing said electric conductors (46a, 46b).

4. An inlet screen according to claim 3, wherein one of said first space and said further spaces (36a, 36b) is provided with said at least one electric heating member (37), wherein the other one of said first and further spaces (36a-36f) is provided with a sensing means (40), the at least one electric heating member (37) being operated in response to said sensing means (40).

5. An inlet screen according to claim 1, wherein said distance holding means (22) comprises at least one distance holding member (24) for keeping the bars (20) in a substantially parallel relationship, said distance holding member (24) being non-detachably or non-detachably connected to a pair of neighbouring bars (20) at said intermediate portion (38a).

6. An inlet screen according to claim 5, wherein said distance holding means (22) comprises a rod (23), wherein a plurality of neighbouring bars (20) are provided with at least one bore (38b) across the intermediate portion (38a) of said neighbouring bars (20), said bore (38b) being positioned in said plurality of neighbouring bars such that the rod (23) is allowed to be introduced through the bore (38b) of the plurality of neighbouring bars.

7. An inlet screen according to claim 6, wherein said distance holding member (24) is hollow and is positioned between neighbouring bars (20) and in front of the bore (38b) of the neighbouring bars in such a way that said rod (23) is allowed to be introduced inside the hollow distance holding member (24), and in such a way that the distance holding member is supported toward said intermediate portion of neighbouring bars.

8. An inlet member according to claim 1, wherein said first space (36) extends from the proximal portion (26a) of said bar (20) to the distal portion (26b) of said bar (20), said bars (20) being supported by an elongated support means (28) arranged across the direction of elongation of said bars (20) at their distal portion (26b), the distal portion (26b) of said bars (20) being welded to said elongated support means (28) in such a way that the first space (36) at the distal portion (26b) of said elongated bar (20) is closed, said at least one electric heating member (37) being provided with electric conductors (46a, 46b), both of which being introduced into said first space (36) of said bar (20), wherein the proximal portion (26a) of said bars (20) is provided with a top cover (32a, 32b, 32c) for housing said electric conductors (46a, 46b).

9. An inlet screen according to claim 8, wherein the exterior of said bar (20) is provided with a sensing means (40), the at least one electric heating member (37) being operated in response to said sensing means (40).

10. An inlet screen according to claim 9, wherein said sensing means (40) comprises at least one sensing member (47a, 47b), said sensing member (47a, 47b) comprising at least one of a conductive sensor and a temperature sensor, or a combination thereof.

11. An inlet screen according to claim 9, wherein said sensing means (40) is arranged substantially at the upstream portion (35) of said bar (20), said sensing member (47a, 47b) comprising a conductive sensor.

12. An inlet screen according to claim 9, wherein said sensing means (40) is arranged substantially at the downstream region (35) of said bar (20), said sensing member (47a, 47b) comprising a conductive sensor.

13. An inlet screen according to claim 1, wherein said bar (20) is made of an extruded polymer or a metal, wherein said extruded metal comprises a light metal or steel.

14. An inlet screen according to claim 1, wherein the lateral dimension of said space (36, 36a-36f) is larger than the lateral dimension of the electric heating member (37), creating at least one gap (39) between the space (36; 36a-36f) and the electric heating member (37) for receiving a substance, said substance being one of a granular material and a liquid, or a combination thereof.

15. An inlet screen according to claim 1, wherein said granular material includes sand or iron fillings.

16. An inlet screen according to claim 1, wherein said liquid is at least one or more of an anti-freezing agent and water.

17. A hydropower plant comprising an inlet screen according to claim 1 in front of the water inlet (8) of a turbine, wherein the bars (20) are arranged in such way that the distal portion (26b) of the bars is underneath the water surface (49), said proximal portion (26a) being arranged at, above or underneath the water surface (49).

18. A hydropower plant according to claim 17, wherein the electric heating member (37) is arranged underneath the proximal portion (26a).

19. An inlet screen according to claim 1, wherein said space (36; 36a) is closed, wherein the lateral dimension of said space (36, 36a-36f) is larger than the lateral dimension of the electric heating member (37), creating at least one gap (39) between the interior surface of the space (36; 36a-36f) and the electric heating member (37) for receiving a substance, said substance being a liquid, wherein the liquid is received in said gap.

20. An inlet screen according to claim 1, wherein the distal portion (26b) of each bar (20) is supported by a support means (28) in the form of an elongated profiled element (30), wherein the spaces (36a, 36b) are covered by the profiled element 30, such that the spaces are closed.

21. An inlet screen according to claim 1, wherein a top cover (32a, 32b, 32c) is provided at the proximal portion of said bars (20), or the proximal portion (26*a*) of the bar 20 is closed by a removable lid or a stopper.

\* \* \* \* \*